United States Patent
Potter et al.

(10) Patent No.: US 6,309,613 B1
(45) Date of Patent: Oct. 30, 2001

(54) CRYSTALLIZING MACHINE

(75) Inventors: Terry C. Potter, Lambertville, MI (US); Peter J. Hatas, Sylvania; Liguo Zhao, Toledo, both of OH (US)

(73) Assignee: Schmalbach-Lubeca AG, Ratlingen (DE)

( * ) Notice: Subject to any disclaimer, the term of this patent is extended or adjusted under 35 U.S.C. 154(b) by 0 days.

(21) Appl. No.: 09/640,327

(22) Filed: Aug. 16, 2000

Related U.S. Application Data

(63) Continuation of application No. 09/349,047, filed on Jul. 7, 1999, now Pat. No. 6,139,812.

(51) Int. Cl.[7] .................................................. B01D 9/00
(52) U.S. Cl. ........................ 422/245.1; 422/249; 422/250
(58) Field of Search ............................... 422/245.1, 249, 422/250, 251

(56) References Cited

U.S. PATENT DOCUMENTS

| | | |
|---|---|---|
| 4,297,306 | 10/1981 | Yoshino et al. . |
| 4,375,442 | 3/1983 | Ota et al. . |
| 4,379,099 | 4/1983 | Ota et al. . |
| 4,386,046 | 5/1983 | Yoshino et al. . |
| 4,388,356 | 6/1983 | Yrivnak et al. . |
| 4,412,966 | 11/1983 | Yoshino et al. . |
| 4,476,084 | 10/1984 | Takada et al. . |
| 4,572,811 | 2/1986 | Ota et al. . |
| 4,589,599 | 5/1986 | Hayashi et al. . |
| 4,590,021 | 5/1986 | Ota et al. . |
| 4,591,060 | 5/1986 | Tsukada et al. . |
| 4,991,728 | 2/1991 | Hayashi et al. . |
| 5,261,545 | 11/1993 | Ota et al. . |
| 5,540,879 | 7/1996 | Orimoto et al. . |
| 5,645,789 | 7/1997 | Roucher, Jr. . |
| 5,650,114 | 7/1997 | Ward et al. . |
| 5,665,297 | 9/1997 | Ward et al. . |

*Primary Examiner*—Felisa Hiteshew
(74) *Attorney, Agent, or Firm*—Emch, Schaffer, Schaub & Porcello Co., L.P.A.

(57) ABSTRACT

A machine for crystallizing a thermoplastic preform or container is constructed from modular subassemblies and utilizes a preheated plug to provide the sole upright support for a workpiece in the crystallizing process. The first modular subassembly includes the workpiece in-feed and plug preheat structures and incorporates the drive apparatus for the entire machine. The opposed end of the crystallizing machine is constructed of a subassembly which operates to provide the turnaround and tensioning takeup for the carrier mechanism transporting the workpieces. Positioned between the first subassembly and the opposed end subassembly are heating and cooling processing modules which can be provided in any number depending on the size constraints and workpiece quantity restraints desired. The processing modules provide the heating and crystallizing processes for the desired area of the workpiece and the cooling process of the workpiece prior to unloading.

5 Claims, 16 Drawing Sheets

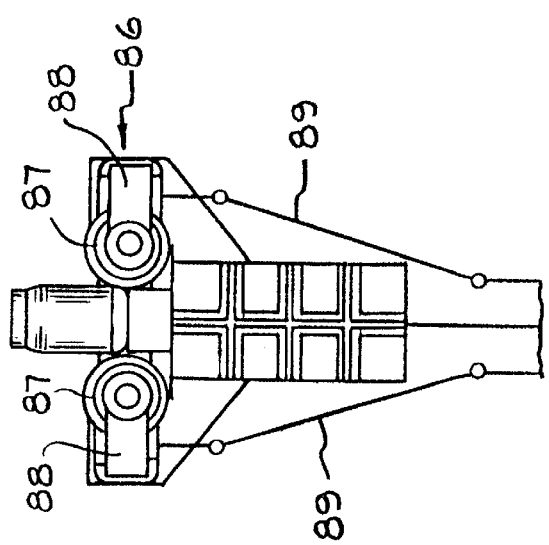
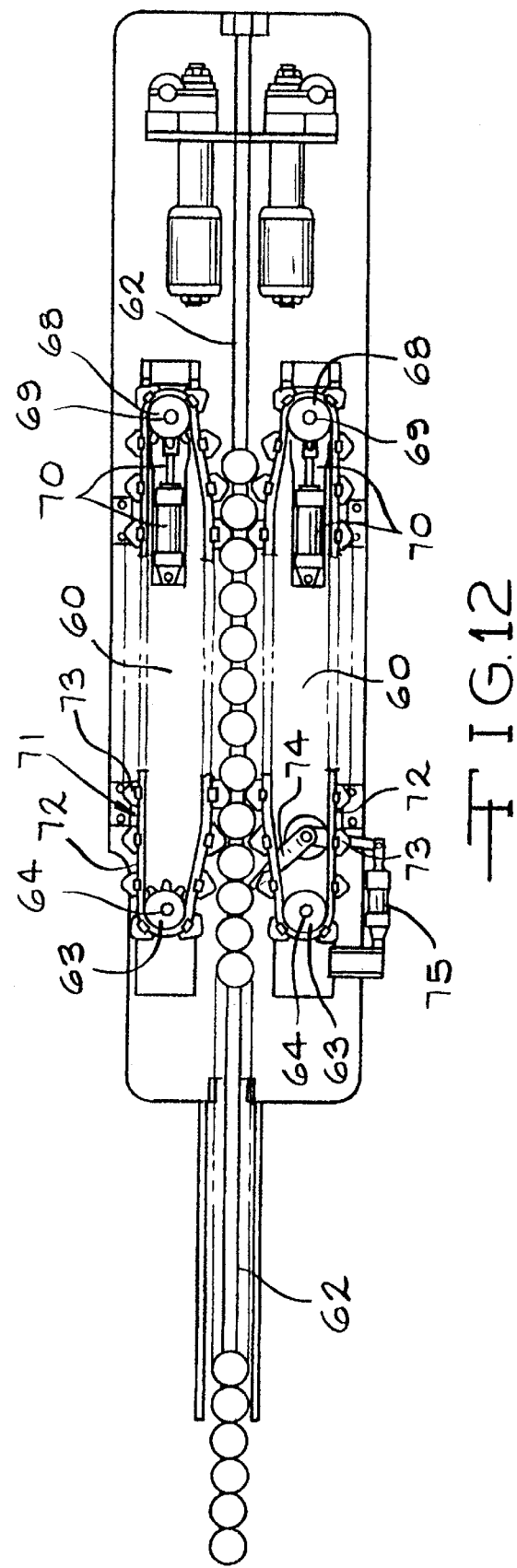
FIG. 11
FIG. 12

CRYSTALLIZING MACHINE

This application is a Continuation of Ser. No. 09/349,047 filed Jul. 7, 1999, now U.S. Pat. No. 6,139,812.

TECHNICAL FIELD

This machine relates to a process and apparatus for use in strengthening the finish area of a hollow blow molded container manufactured from a thermoplastic, such as a thermoplastic polyester or a biaxially oriented polyethylene terephthalate resin.

BACKGROUND ART

A hollow blow molded thermoplastic, such as a thermoplastic polyester or a biaxially oriented polyethylene terephthalate resin, "PET", container, commonly used to contain food or beverage, has excellent physical properties, durability, and a wide range of applications. However, when used in hot-fill applications, certain portions of the container which are not subjected to the biaxial orientation during the blow molding process, such as the neck area seal edge or thread, commonly referred to as the finish area, are found to soften and deform in an undesirable manner because the temperature of the food or beverage fill is often above the glass transition temperature of the plastic. Many methodologies and processes have been tried in attempts to strengthen the neck area of such containers by enhancing the density of the resin and opacifying and whitening the neck due to the crystallization of the thermoplastic resin by heat treating the neck.

Strengthening the neck area of a thermoplastic container greatly increases the craze resistance of the neck area, improves the mechanical rigidity and increases impact resistance, wear resistance, and external pressure resistance of the container. However, a common side effect of such a thermal treatment of the neck area of the container is an undesirable deformation of the neck area, thus leading to problems with capping and sealing the container.

U.S. Pat. No. 4,476,084 provides a solution to the problem of deformation during heat treating by placing a cold die pin or plug into the bore of the neck prior to heating. The cold die pin assists in maintaining the proper size and shape of the neck during the crystallization process. Others have found similar solutions. See, for example, U.S. Pat. Nos. 4,388,356, 4,379,099, 4,572,811, 4,590,021 and 5,261,545. The use of such cold plugs and dies however have led to problems when speed of manufacture is a priority. Inefficient heating, failure to properly position the plug and deformation of the thermoplastic container due to the weight of the plug have commonly been experienced, thereby leading to a further search for a fast, efficient way of crystallizing the neck area of the thermoplastic container.

BRIEF DESCRIPTION OF THE INVENTION

The crystallizing machine and its process of this invention improves upon the efforts of the prior art in many ways. The machine makes use of a preheated plug which is inserted into the mouth or neck of a thermoplastic preform or container, commonly known as a workpiece. While the workpiece is described herein as being a thermoplastic, it is preferable that it be a thermoplastic polyester, and even more preferable that it be polyethylene terephthalate (PET). For the purposes of this description, references will be made to PET workpieces. However, this description is not intended to be limiting on the invention described herein. The workpiece is carried solely in an upright position by the preheated plug through the crystallizing process. The preheated plug assures even and efficient heating when crystallizing the finish area of the workpiece and constrains the shape of the finish area to a predetermined size and shape during the crystallizing process.

The crystallizing machine of the present invention is constructed from modular subassemblies. The first modular subassembly includes the workpiece in-feed and plug preheat operations and incorporates the power source and drive apparatus for the entire machine. The opposed end of the crystallizing machine is constructed of a module or subassembly which operates to provide the turnaround and tensioning for the transport member carrying the workpieces. Positioned between the first modular subassembly and the opposed end modular subassembly are heating and cooling processing modules or subassemblies which can be provided in any number, depending on the size constraints and workpiece quantity restraints desired. The processing modules provide the heating and crystallizing processes for the finish area of the workpiece and the cooling process for the workpiece prior to unloading.

For the purposes of the following description of the preferred embodiment, reference will be had to the following drawings and the crystallizing machine of the present invention will be described as having four subassemblies. However, the description of the invention is not intended to be limiting upon the scope of the claims which follow.

BRIEF DESCRIPTION OF THE DRAWINGS

FIG. 11 is an end view of the workpiece stripper of the in-feed apparatus of FIG. 10.

FIG. 12 is a top view of the in-feed apparatus of FIG. 10.

DETAILED DESCRIPTION OF THE PREFERRED EMBODIMENT

Figure 3:
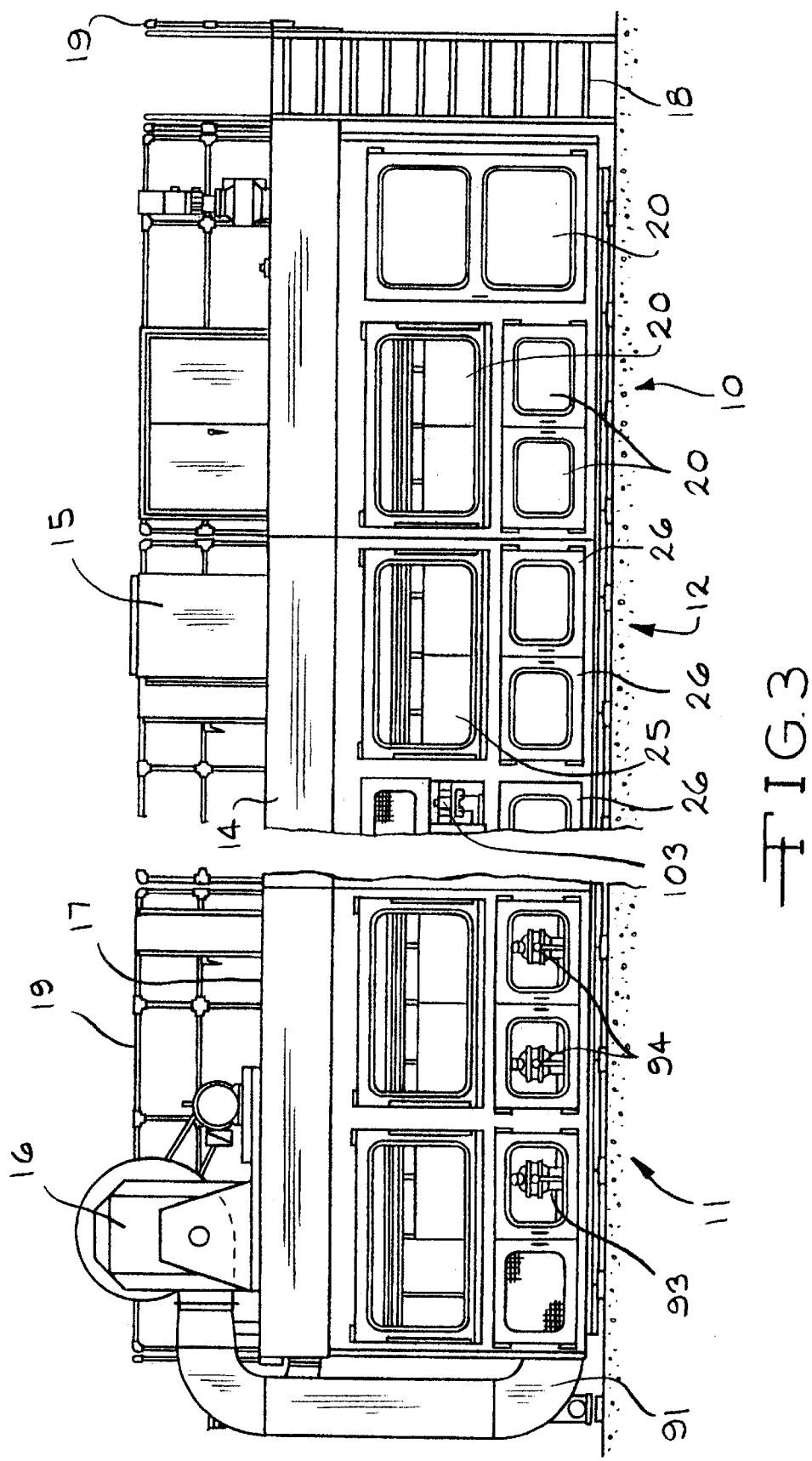
FIG. 3 is a left side elevation view with cutaway of the crystallizer machine of the present invention.
Figure 4:
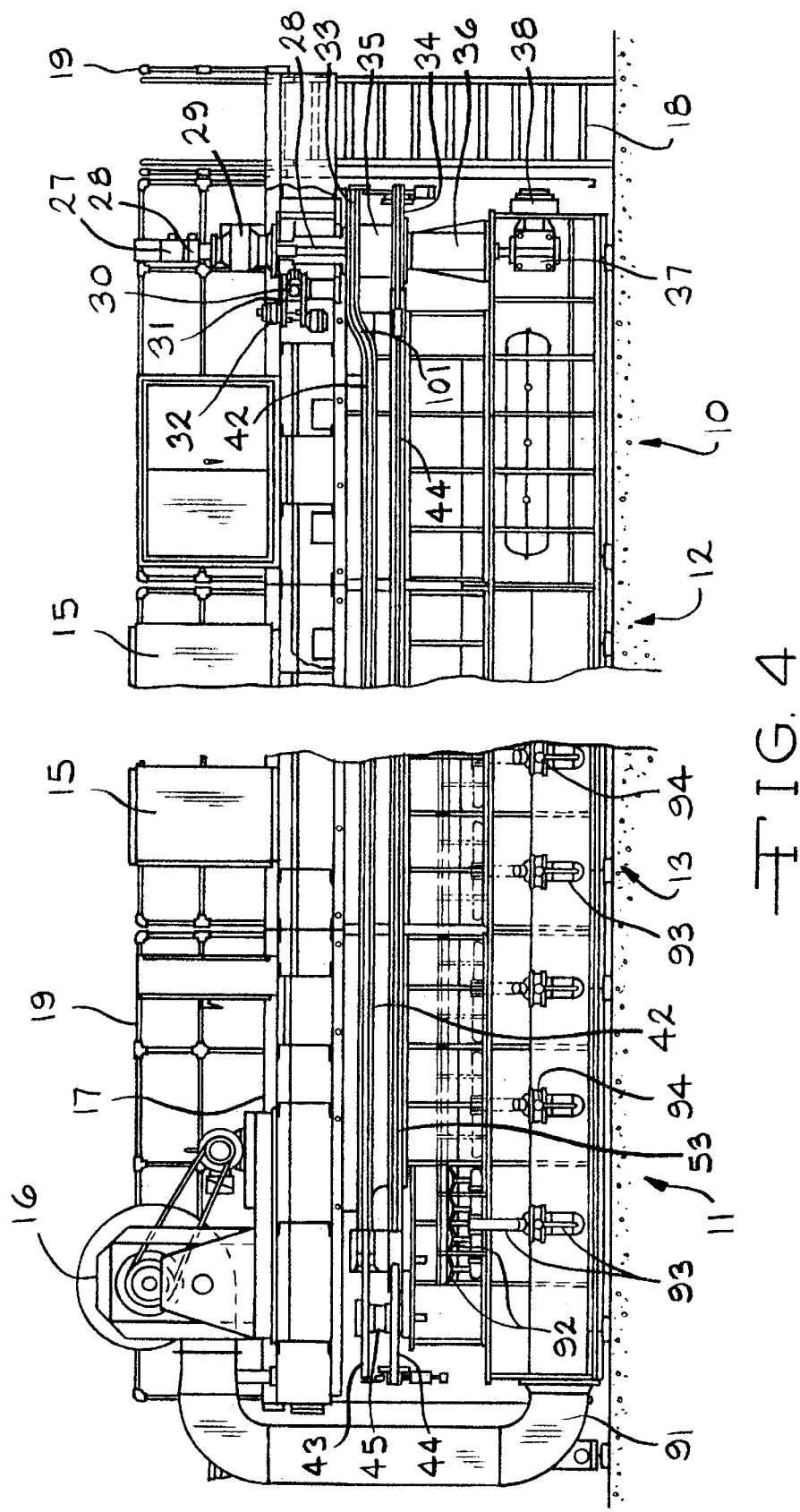
FIG. 4 is a left side elevation view with cutaway of the crystallizer machine of the present invention with access doors removed.
Figure 5:
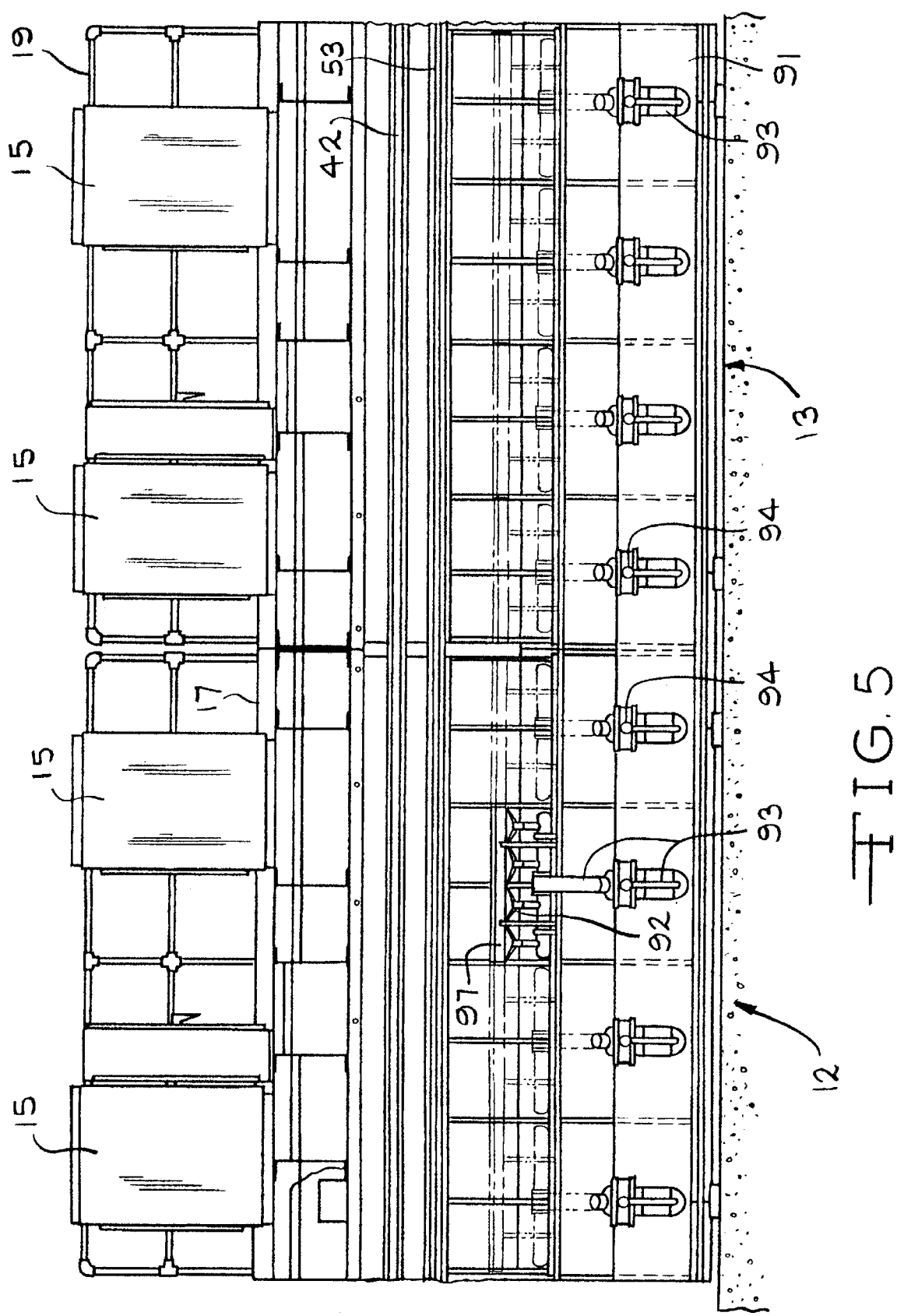
FIG. 5 is a cutaway right side elevation view of the processing modules of the crystallizer machine of the present invention.
Figure 6:
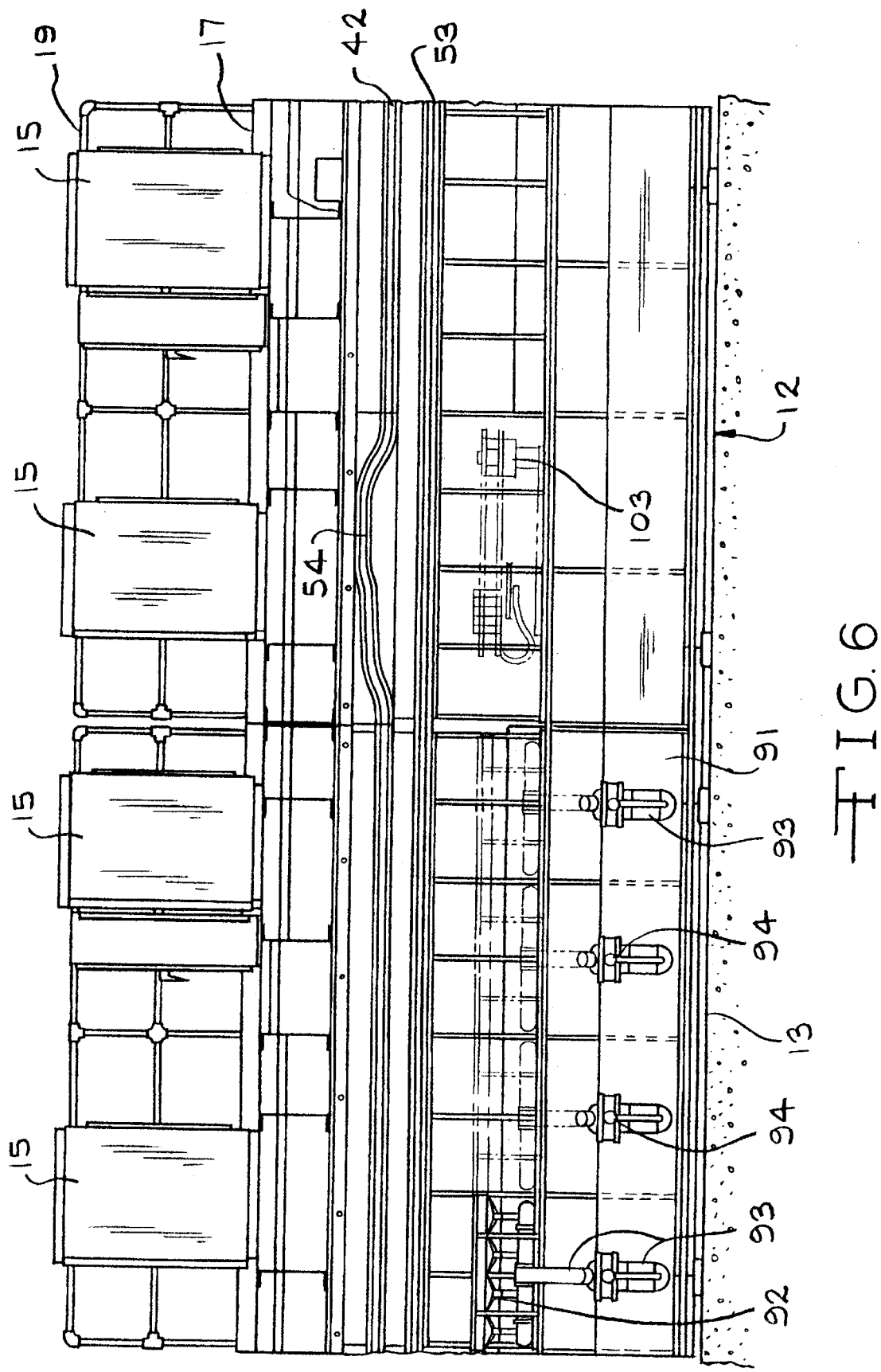
FIG. 6 is a cutaway left side elevation view of the processing modules of the crystallizer machine of the present invention.
Figure 7:
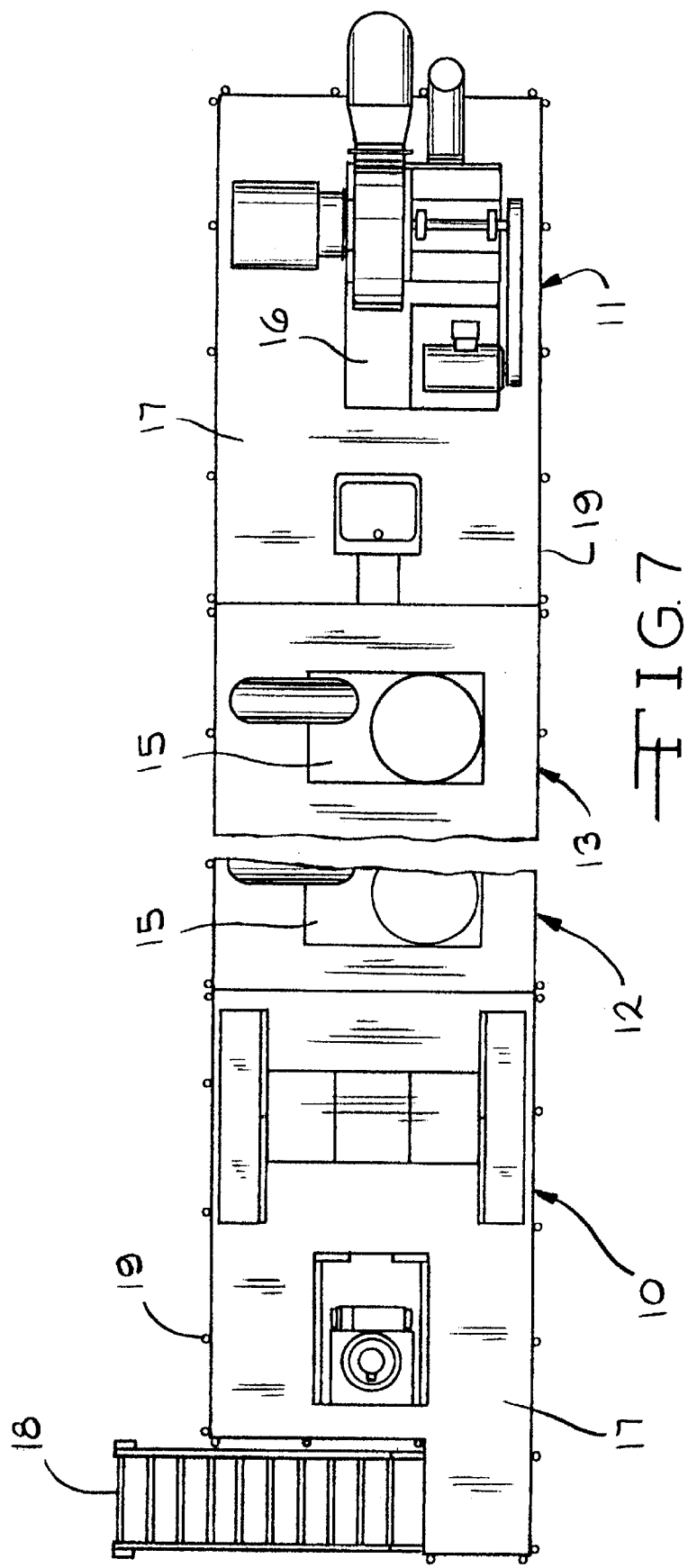
FIG. 7 is a top view with cutaway of the crystallizer machine of the present invention.
Figure 13:
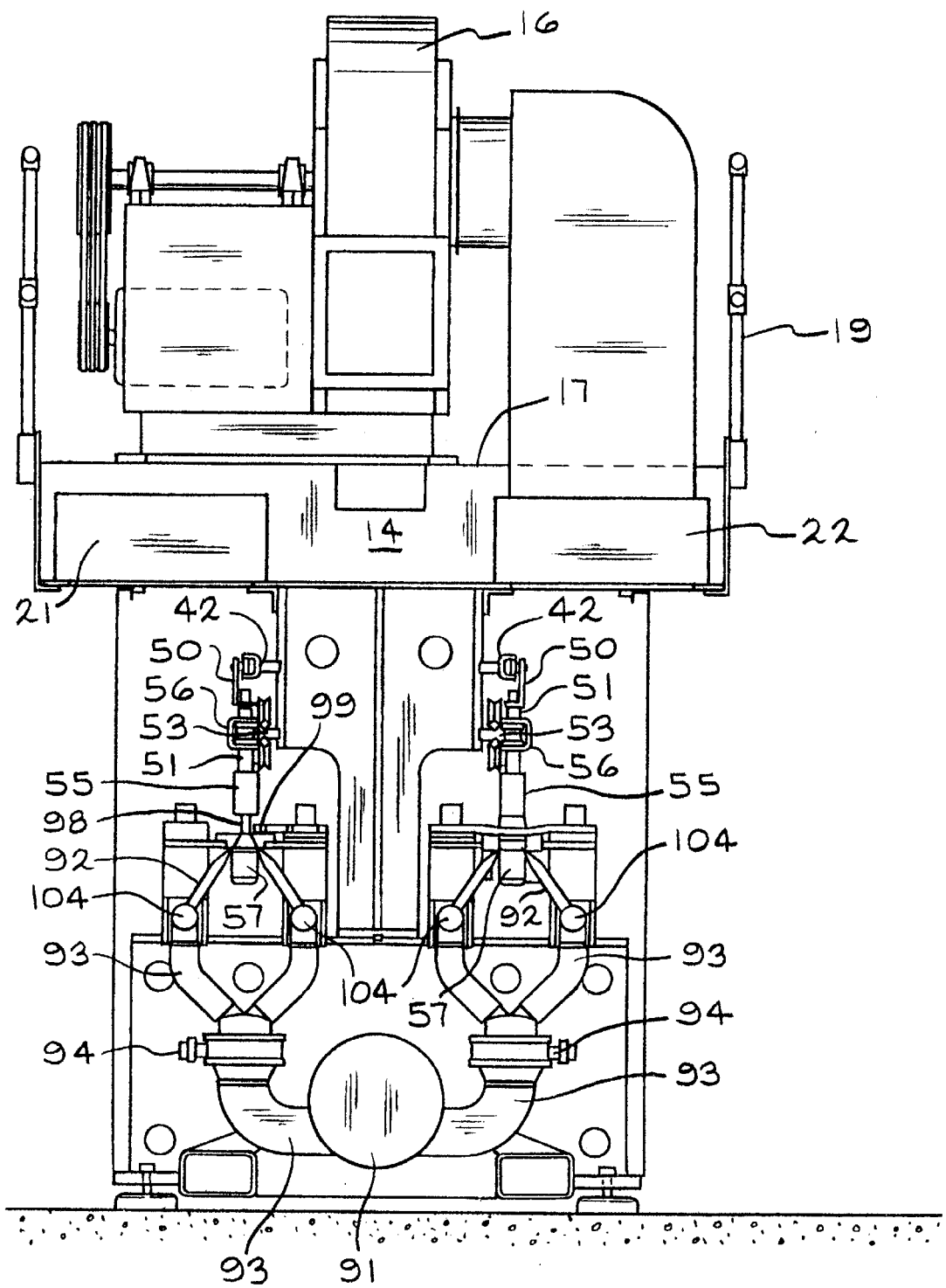
FIG. 13 is a back elevation view of the processing modules of the crystallizer machine of the present invention.

Referring now to FIGS. 1–6, the crystallizer machine of the present invention as described herein is shown to have four modular sections. The number of modular sections can be varied as desired by increasing the number of processing sections, as shown in FIGS. 5 and 6, in order to meet design demands for workpiece size, material and speed of operation. For the purposes of this description, the crystallizer machine will be described as having four distinct modular sections: the preheat, pickup and drive module 10 as shown in FIGS. 1–4; the takeup module 11 as shown in FIGS. 1–4; and the heating and cooling processing modules 12, 13 as shown in FIGS. 5 and 6. The modules of the crystallizing machine are designed to provide a mezzanine level 14, when joined together into a single operative machine. The mezzanine level 14 carries the cold air generating units 15 and blower fan units 16 and provides a walkway 17 for the operators. The mezzanine level 14 is accessible by a ladder or step assembly 18 provided on the end of the preheat, pickup and drive module 10 and includes safety railings 19 provided about the perimeter of the mezzanine level 14. The floor of the mezzanine 14 incorporates a hot air plenum 21 and a cold air plenum 22 as shown in FIG. 13.

Figure 1:
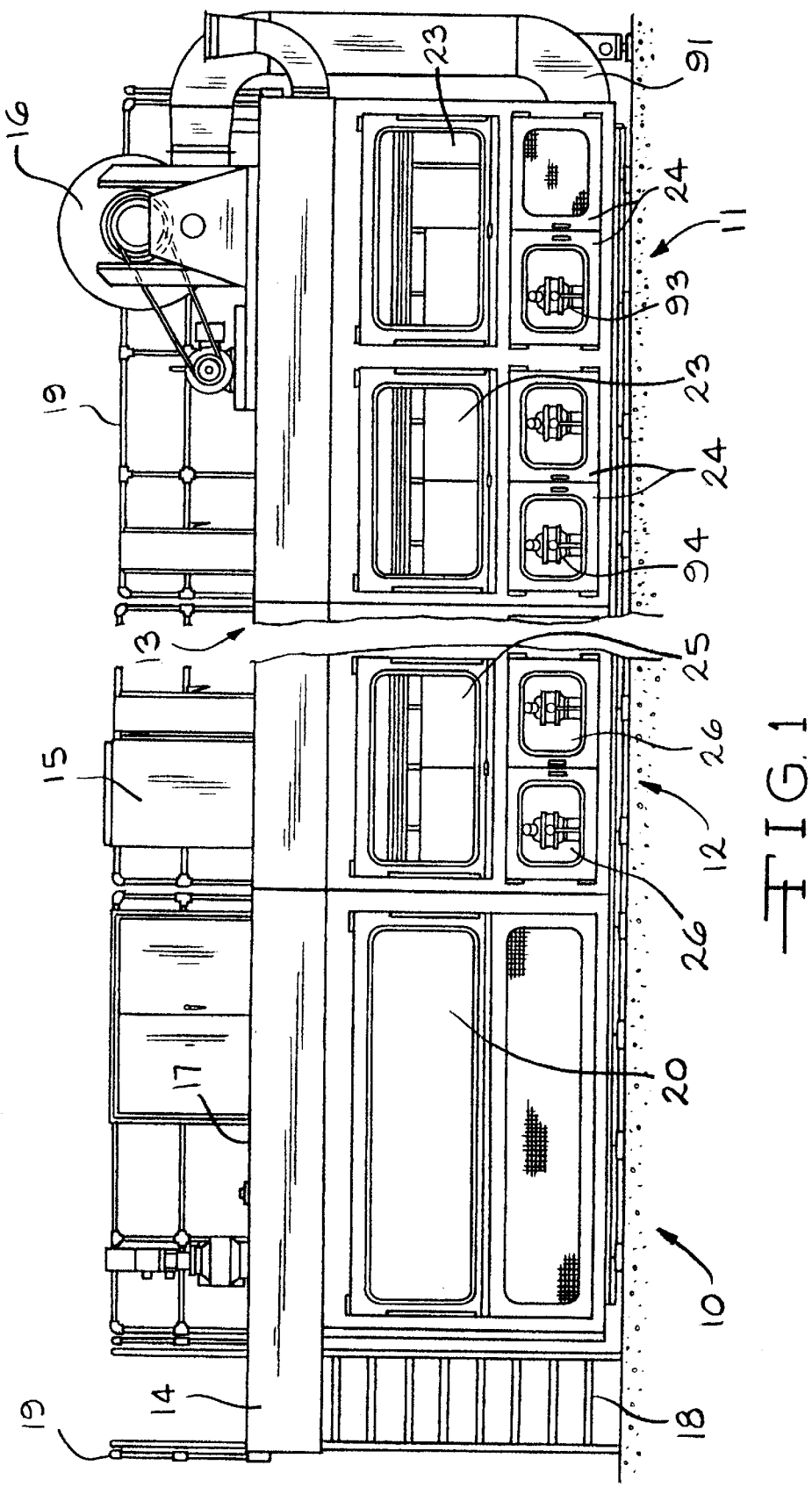
FIG. 1 is a right side elevation view with cutaway of the crystallizer machine of the present invention.

Access doors 20 are provided on the front and back of the preheat, pickup and drive module 10, as shown in FIGS. 1 and 3, which when opened, provide access to the machinery contained within the module 10 and when closed, provide a safety barrier. The access doors 20 preferably have glass windows through which the operator can observe the machinery operation.

Referring again to FIGS. 1 and 3, the takeup module 11 includes a pair of top access doors 23 located on the front and back of the module 11 and a set of bottom access doors 24 also located on the front and back of the module. The access doors 23, 24 when closed, facilitate the maintenance of desired internal atmosphere regulation, as it relates to the heating and cooling in the crystallizing process. The access doors 23, 24 are also used as safety shields when the machine is in operation and provide access to the internal machinery when opened.

Referring also to FIGS. 1 and 3, the processing modules 12, 13 each include a pair of top access doors 25 and a set of bottom access doors 26. As with the access doors for the other modules, the access doors 25, 26 when closed, facilitate the maintenance of desired internal atmosphere regulation, as it relates to the heating and cooling in the crystallizing process. The access doors 25, 26 also provide a safety shield for the operator when closed and provide access to the internal machinery when opened.

Figure 2:
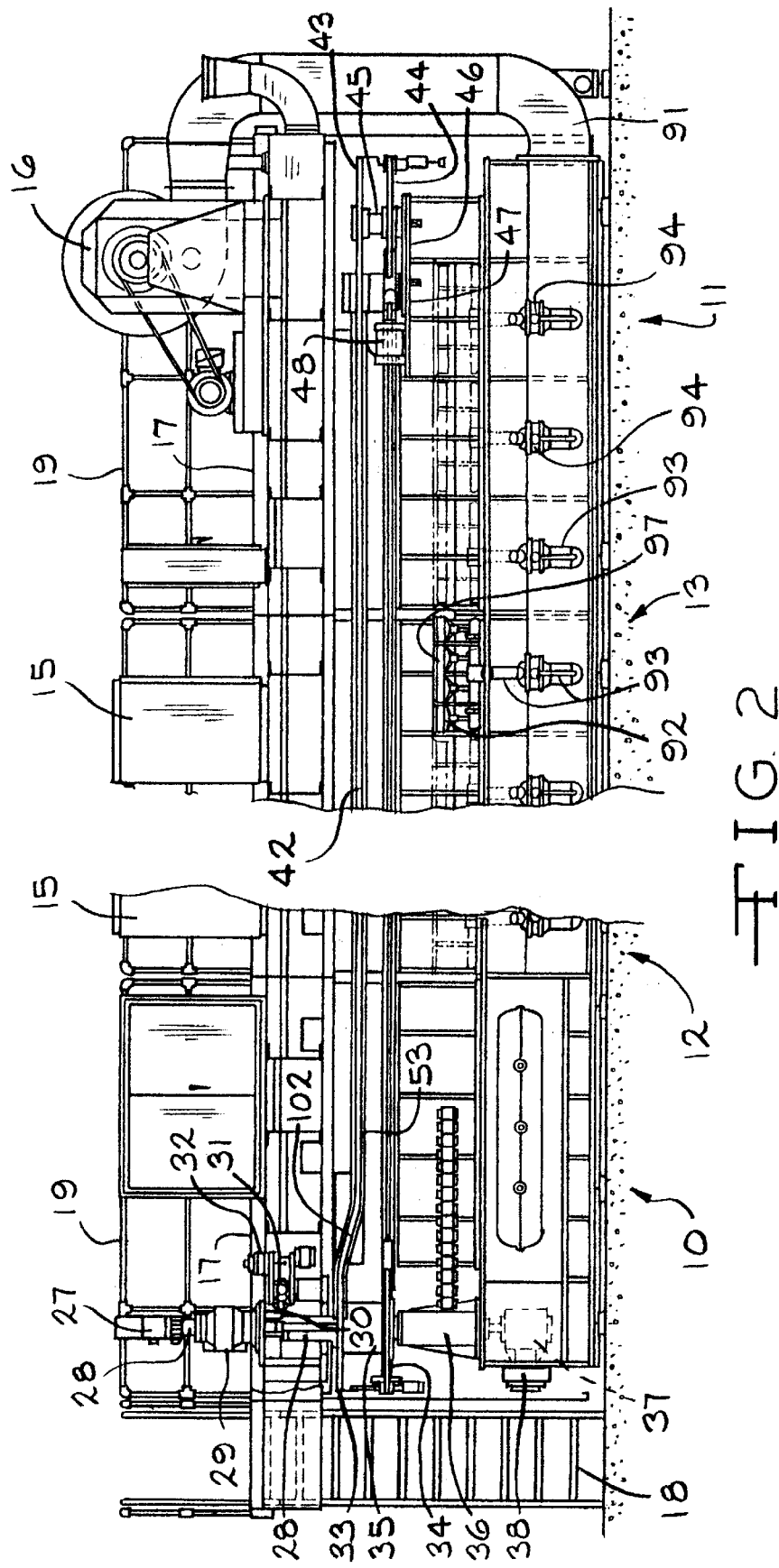
FIG. 2 is a right side elevation view with cutaway of the crystallizer machine of the present invention with access doors removed.

Referring now to FIGS. 2 and 4, the drive mechanism for the crystallizer machine is located in the preheat pickup and drive module 10. The drive mechanism includes a motor 27 engaged with a drive shaft 28 through a gear reducer 29. The drive mechanism further includes a brake assembly, detailed in FIG. 9, composed of a disc brake rotor 30 fixed to the drive shaft 28, brake shoes 31, and brake actuator 32. A drive sprocket rotary cam 33 is engaged with the drive shaft 28 and a drive sprocket 34 is also engaged with the drive shaft 28 through coupler 35. A secondary drive shaft 36 is engaged with the drive sprocket 34 and receives drive forces imparted by the drive motor 27 through the drive shaft 28 and coupler 35. The secondary drive shaft 36 provides driving forces through the 90° gear box 37 to a timing belt drive pulley 38.

Referring now to FIGS. 8–12, the timing belt drive pulley 38 is engaged with a timing belt driven pulley 39 by drive timing belt 40. Thus, drive power is imparted from the drive motor 27 to the in-feed apparatus, shown in detail in FIGS. 9–12, by the in-feed drive shaft 41. The details of the in-feed mechanism will be discussed below.

Referring to FIGS. 2, 4, 5, 6, 8 and 13, the transport member is shown. A top rail 42 is aligned with the drive sprocket rotary cam 33 and a takeup traction wheel rotary cam 43 which is located in the takeup module 11. The top rail 42 extends the full length of the crystallizing machine. A bottom rail 53 is aligned with the drive sprocket 34 and extends the full length of the crystallizing machine to a lower takeup traction wheel 44, also located in the takeup module 11. The takeup traction wheel rotary cam 43 and takeup traction wheel 44 assembly is joined together by a shaft 45 mounted in a spherical bearing which is bolted to a frame member 46. The frame member 46 is mounted on a slide bar frame 47. A pneumatic piston actuator 48 is engaged with the frame member 46 and provides a positive force against the frame member 46, thereby tensioning the takeup traction wheel rotary cam 43 and traction wheel 44 assembly to provide full tension and takeup on the plug carrier 49 which is engaged between the drive sprocket 34 and the lower takeup traction wheel 44.

Referring now to FIGS. 9–12, the preheat, pickup and drive module 10 is shown in detail. Viewing FIG. 9, the drive sprocket rotary cam 33 is in alignment with the top rail 42. Cam follower members 50 are engaged with the top rail 42 for guided travel thereon around the machine. Referring to FIGS. 2, 4, 5 and 6, it can be seen that the cam follower members 50 will travel along the top rail 42 from the drive sprocket rotary cam 33, past the takeup traction wheel rotary cam 43 and return to the drive sprocket rotary cam 33. The drive sprocket rotary cam 33 is elevated in relation to the top rail 42 for reasons set forth below. Each cam follower member 50 carries an elongated quill 51 at the end of which is a plug 52 which is preferably composed of a coated metal, such as hard coat anodized aluminum. Drive sprocket 34 and lower takeup traction wheel 44 are in alignment with the bottom rail 53. A plug carrier 49 is fixed to travel on the bottom rail 53 as it is driven by the drive sprocket 34. The plug carrier 49 includes a plurality of cam members 56 which ride on the bottom rail 53. The plug carrier 49 also includes a plurality of openings, preferably two per plug carrier link through which the quills 51 extend. Workpiece strippers 55 are fixed to the plug carrier 49 in alignment with the openings and the quills 51 and plugs 52 extend therethrough. Each workpiece stripper 55 and its respective quill 51 and plug 52 have matching centerlines. The plug carrier 49 provides the drive movement to the combined plurality of top cam follower members 50 and attached quills 51 and plugs 52 and bottom cam members 56 with workpiece strippers 55. The top cam follower member 50 and top rail 42 combination provides vertical centering for the plug 52 and the bottom cam member 56 and bottom rail 53 combination provides horizontal centering for the plug 52. Thus, the plug centerline is maintained on very rigid vertical and horizontal axes.

Figure 9:
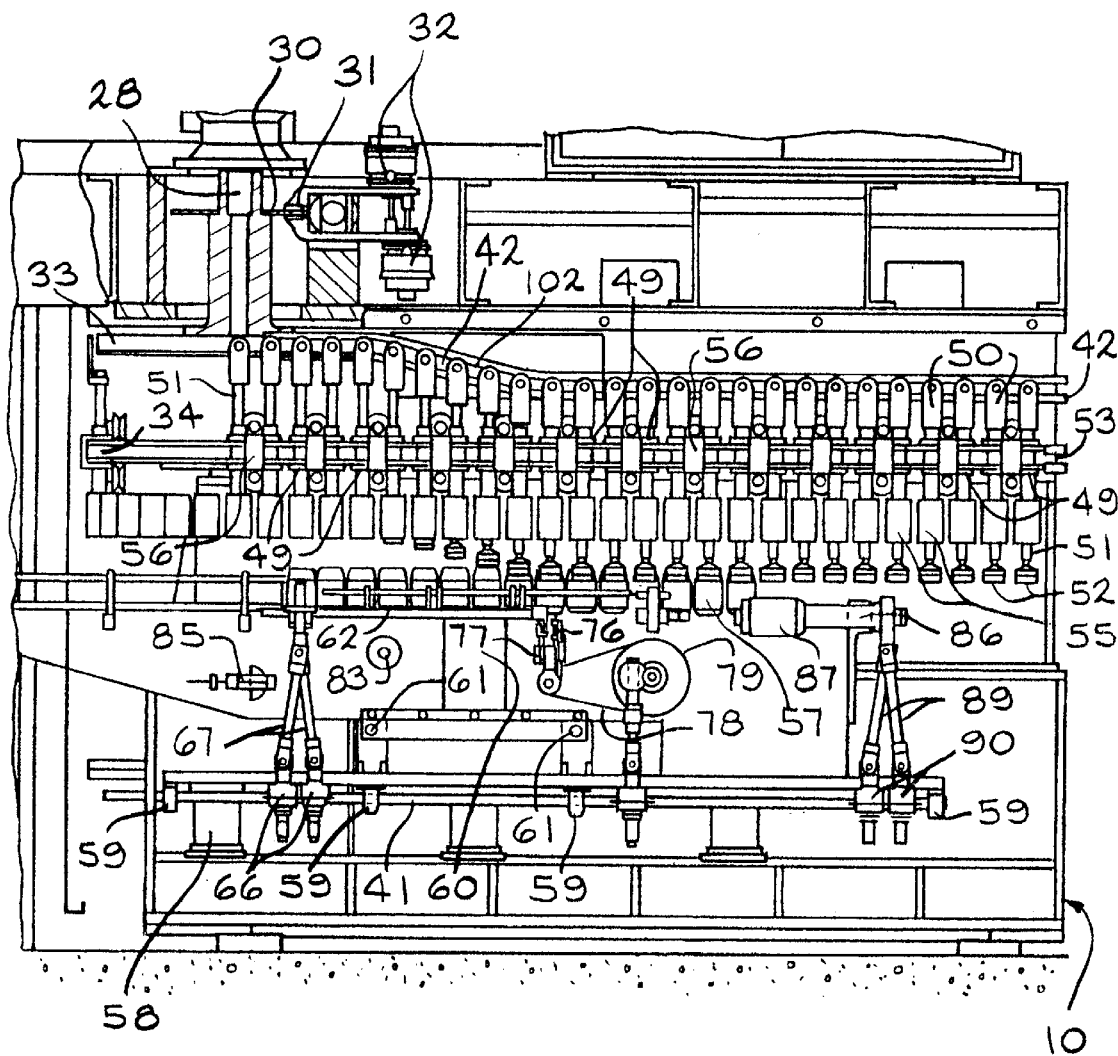
FIG. 9 is a detail side elevation view of the preheat, pickup and drive module of the crystallizer machine of the present invention.

The top rail 42 is designed to have a first elevated portion 54 located on the left side of processing module 12, as shown in FIG. 6, and a second elevated portion 101, shown in FIG. 4, located on the left side of the preheat, pickup and drive module 10, which aligns the rail 42 with the drive sprocket rotary cam 33. The top rail 42 also includes an inclined portion 102 which immediately follows the drive sprocket rotary cam 33 located on the right side of the preheat, pickup and drive module 10, as shown in FIGS. 2 and 9. In operation, it can be seen that when the cam follower members 50 with attached quill 51 are traveling along the top rail 42 around the drive sprocket rotary cam 33, the respective plugs 52 are pulled up and positioned within the workpiece stripper 55. As each cam follower member 50 with attached quill 51 travels down the inclined portion 102 of the top rail 42, the quill 51 gradually is extended through the workpiece stripper 55, thereby positioning the plug 52 to a predetermined location below the workpiece stripper 55. It is in this position that the plug 52 engages the workpiece to carry it through the processing operations of the crystallizing machine. After the workpiece is fully processed, the cam follower member 50 travels up the first elevated portion 54 of the top rail 42 which pulls the plug 52 up into the workpiece stripper 55, thus forcing the workpiece to be removed from its engagement of the plug 52. The finished workpiece is then removed from the crystallizer machine by the exit conveyor 103, shown in FIGS. 3 and 6. As the cam follower member 50 continues to travel along top rail 42, it exits the first elevated portion 54, moving to a lower position, thereby extending the plug 52 from the workpiece stripper 55. The plug 52 is then preheated by heat lamps 96, as will be described in detail later herein. As the cam follower member 50 travels up the second elevated portion 101 of the top rail 42, the preheated plug 52 is retracted into the workpiece stripper 55. The cam follower member 50 is carried by the drive sprocket rotary cam 33 to the inclined portion 102 of the rail 42. As the cam follower member 50 travels down the inclined portion 102, the preheated plug 52 extends out of the workpiece stripper 55 to engage a new workpiece.

Figure 8:
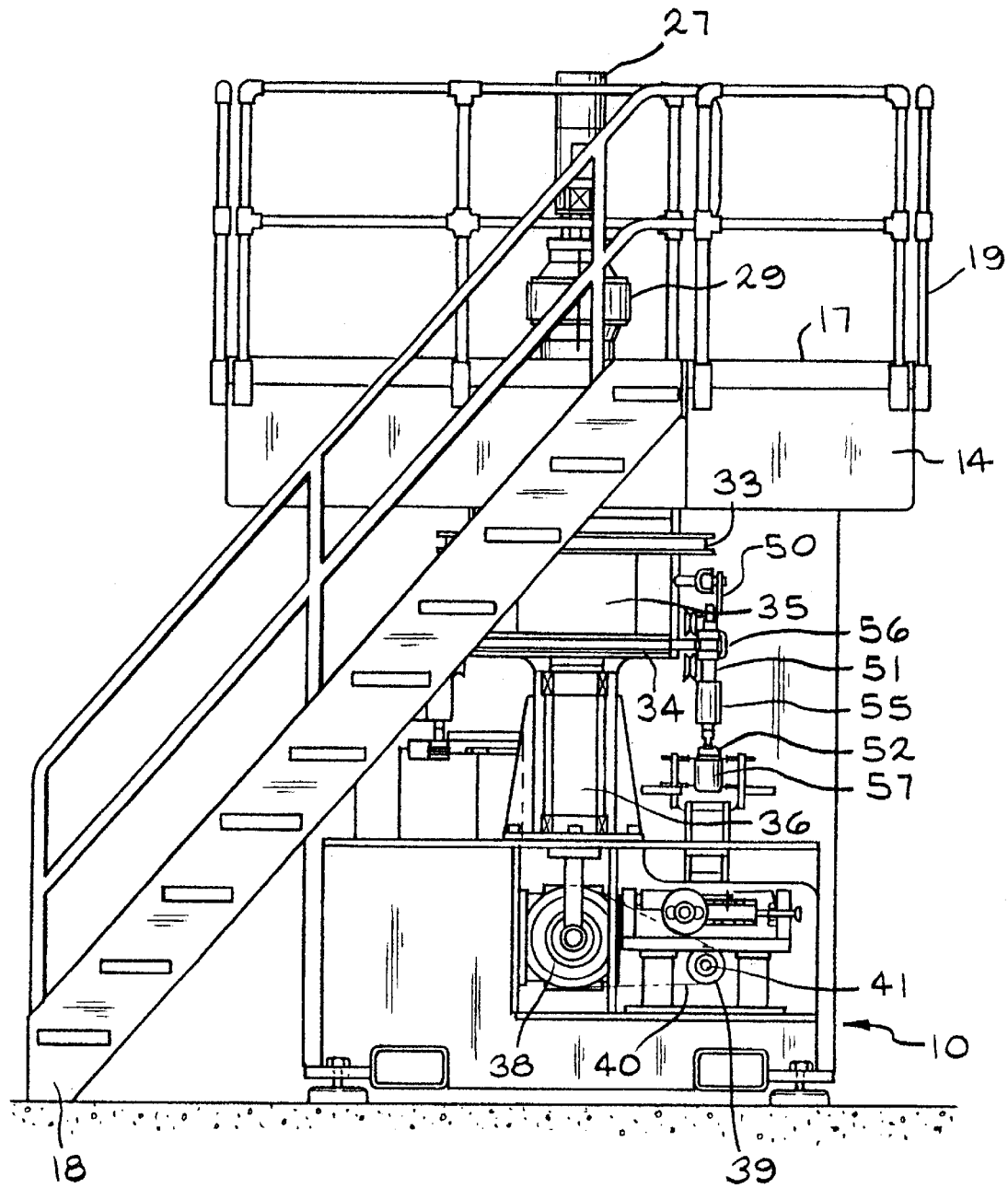
FIG. 8 is a front elevation view of the preheat, pickup and drive module of the crystallizer machine of the present invention.

Referring still to FIGS. 9–12, the in-feed apparatus is shown in detail. The in-feed apparatus is positioned within the preheat pickup and drive module 10 to feed workpieces 57 into engagement with the preheated plug 52. The in-feed apparatus includes a support frame 58 which carries a drive shaft 41 mounted in bearings 59. The drive shaft 41 has the driven timing belt pulley 39 fixed on one end which is engaged with the drive timing pulley 38 by the drive timing belt 40 which receives input from the secondary drive shaft 36 as shown in FIG. 8. A pair of opposed support blocks 60 are fixed for movement on rods 61 which are mounted on the support frame 58. The support blocks 60 are capable of movement toward and away from each other on the rods 61 in order to accommodate different size workpiece. Located between the support blocks 60 is a conveyor belt and platform 62 which carries bottles or workpieces from a feed bin (not shown) which is positioned adjacent the crystallizer machine of this invention. The conveyor 62 aligns the workpieces for movement through the in-feed apparatus. Each support block 60 carries a drive sprocket 63 mounted on a phase adjustable hub 64 and bearing housing 65. The drive sprocket 63 receives drive input from the drive shaft 41 through 90° bearings 66 and drive shafts 67. Located at the ends of the support blocks 60 in opposition to the drive sprockets 63 are takeup sprockets 68. The takeup sprockets 68 are mounted on keyed bearing hubs 69 positioned in a slot located in the support block 60. Air cylinders 70 are fixed to each keyed bearing hub 69 to provide a positive force against takeup sprockets 68 and thereby create tension on the cleated chain 71 which is engaged by each set of drive sprockets 63 and takeup sprockets 68. The cleated chain 71 is composed of a chain member 72 having cleats 73 attached thereto. The cleats 73 are adjustable on the chain member 72 and can be positioned to provide differing centerlines to adapt the cleated chain 71 to different size workpieces entering the in-feed apparatus. The cleated chains 71 are driven through the drive shafts 67 and drive sprockets 63 in rotationally opposite directions to provide movement in coordination with the moving conveyor belt 62, thereby centering the workpieces 57 in alignment with the centerlines of the plugs 52 which are in position above the in-feed apparatus. Thus, as each quill 51 and plug 52 is extended in a downward direction by the cam follower members 50 traveling down the inclined portion 102 of the top rail 42, the plug will cleanly engage the open mouth of the workpiece as shown in FIG. 9.

Figure 10:
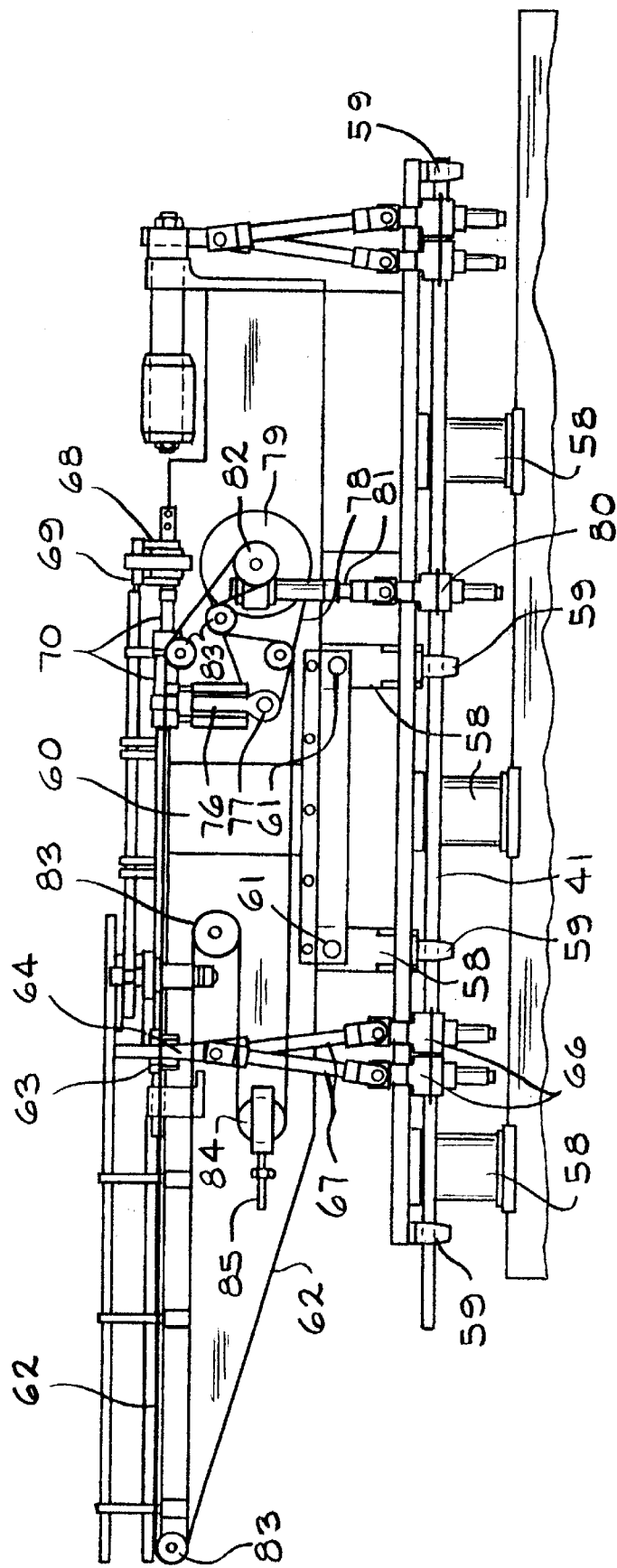
FIG. 10 is an elevation view of the in-feed apparatus of the preheat, pickup and drive module of FIG. 9.

A stop 74 driven by a pneumatic air cylinder 75, shown in FIGS. 10 and 12, is positioned at the mouth of the in-feed conveyor 62 to prevent movement of workpieces into the cleated chain 71 area during non-operation of the crystallizing machine and shutdown of the in-feed apparatus. A bump bar 76, shown in FIG. 10, is positioned at the end of the conveyor belt 62 where the workpieces 57 engage the plugs 52. The bump bar 76 provides an upward force on the surface of the conveyor belt 62 which acts to firmly press and seat the workpiece 57 onto the plug 52. The bump bar 76 is driven by a cam member 77 engaged by a belt 78 to a drive pulley 79. The drive pulley 79 receives its drive from the drive shaft 41 through a 90° bearing 80 and drive shaft 81. A conveyor head pulley 82 is also positioned to receive drive from the drive shaft 81. The conveyor belt 62 is driven by the conveyor head pulley 82 and is carried by pulleys 83, including takeup pulley 84 which is tensioned by an air cylinder 85.

Also positioned on support frame 58 is an in-feed workpiece stripper 86, shown in FIGS. 10 and 11, composed of a pair of cushioned rollers 87 mounted on an adjustable support block 88 and driven by drive shafts 89 which receive input through 90° bearings 90 attached to the in-feed drive shaft 41. Infrared or dielectric sensors (not shown) are used to indicate whether the workpiece 57 has been firmly engaged with the plug 52. If the workpiece is not firmly engaged with the plug 52, the in-feed workpiece stripper 86 is activated and the rollers 87 engage the workpiece and remove it from the plug 52.

Figure 14:
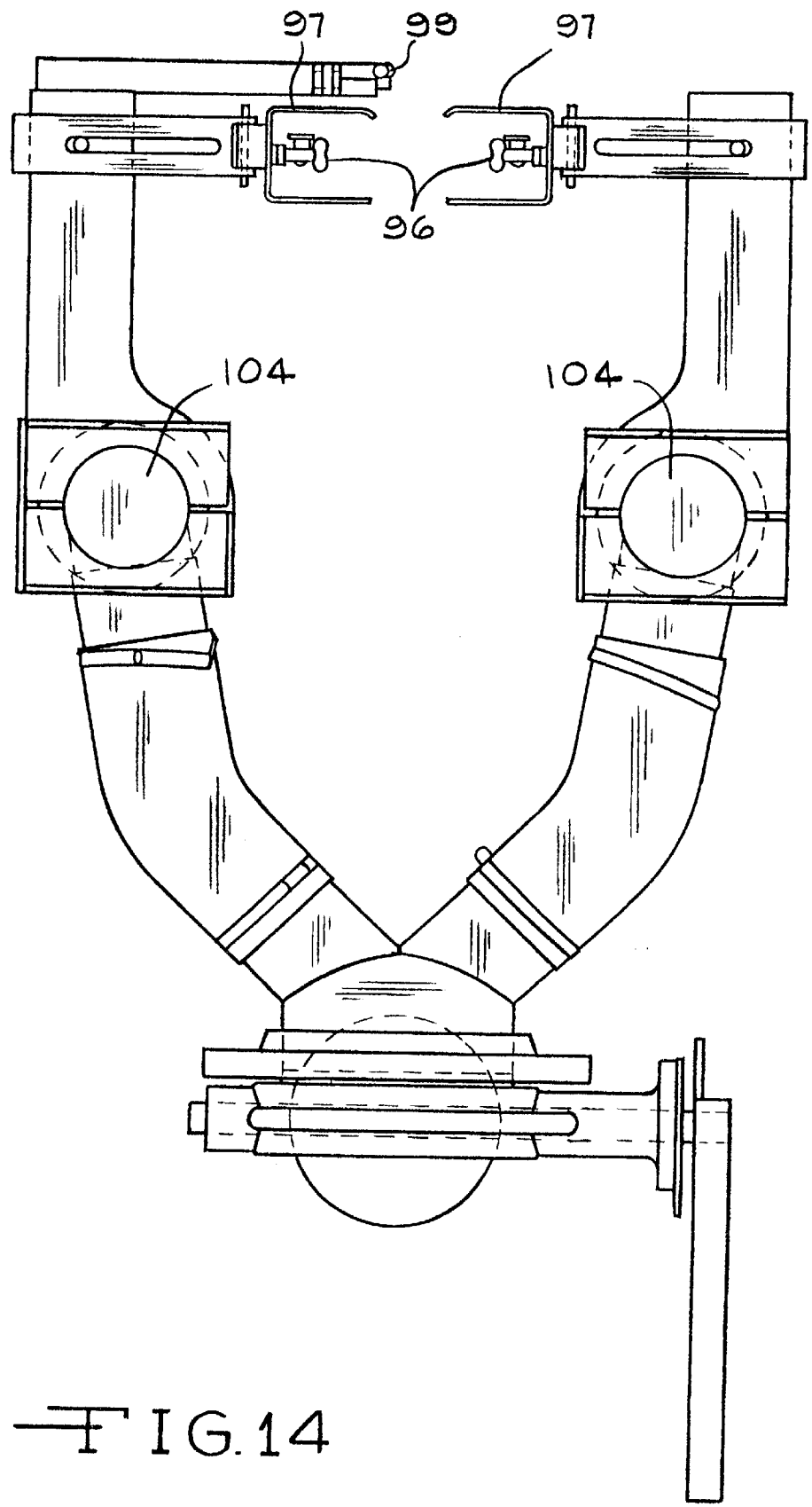
FIG. 14 is a detail elevation view of the preheating source used in the crystallizer machine of the present invention.
Figure 15:
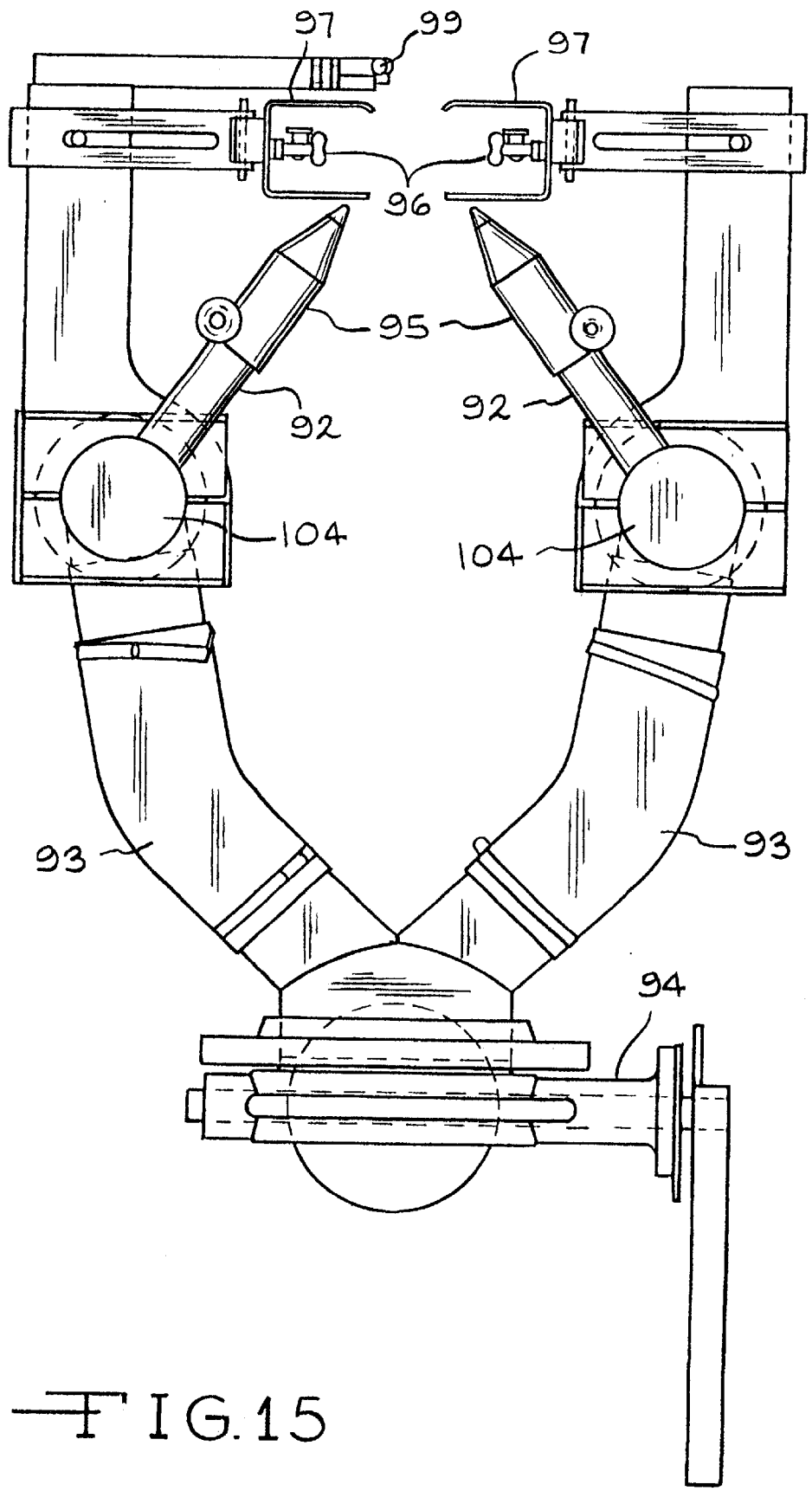
FIG. 15 is a detail elevation view of the cooling source and the heating source used in the crystallizer machine of the present invention.
Figure 16:
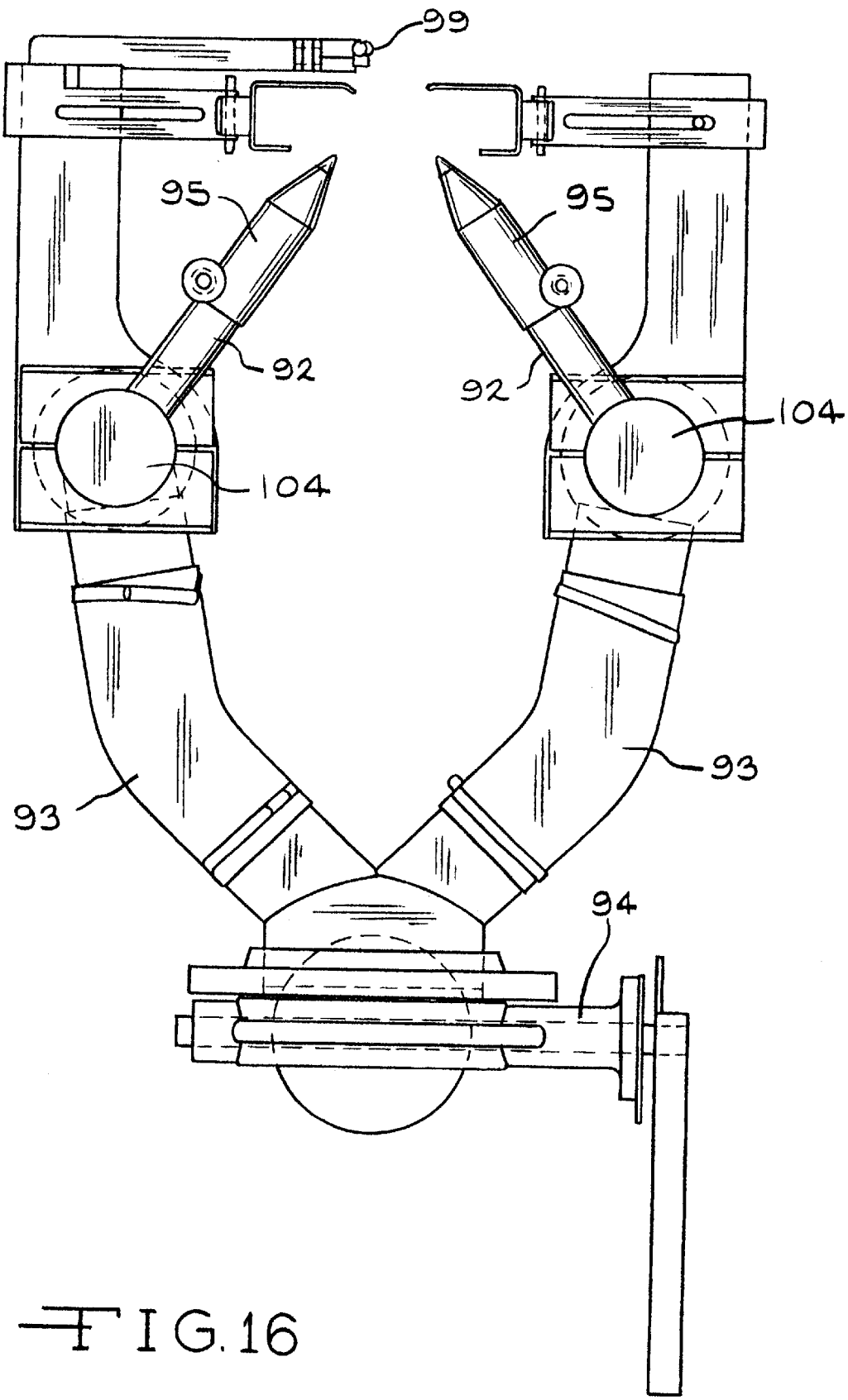
FIG. 16 is a detail elevation view of the cooling source used in the crystallizer machine of the present invention.

Referring now to FIG. 13, and FIGS. 2, 4 and 5, the heating and cooling apparatuses of the crystallizer machine of the present invention are detailed. FIG. 13 shows a back elevation view of the crystallizer machine showing the top rail 42 and bottom rail 53 which carry the cam follower members 50, 56, quill 51, workpiece stripper 55 and plug 52. FIG. 13 also shows the blower 16 for supplying cooling air to the cooling air plenum 22 which in turn supplies the cooling air to the cooling air duct 91 located at the bottom of the crystallizer machine. The cooling air duct 91 runs the length of the machine and supplies cooling air to the individual air knives 92 through adjoining duct work 93. Positioned in the duct work 93 are individual valve controls 94 which are used to regulate the amount of cooling air traveling to each set of air knives 92. Referring to FIGS. 15 and 16, the cooling air knives 92 include nozzles 95 which are rotatably mounted on the duct work 93. The duct work 93 includes flexible joints 104. Thus, the nozzles 95 may be adjusted by rotation and by movement of the duct work 93 about the joints 104 to adapt to differing sizes of workpieces. Referring to FIG. 15, the structure wherein the cooling air knives 92 are used in cooperation with heat sources to provide crystallizing temperature and cooling temperature simultaneously is shown. Positioned immediately above the air knives 92, as shown in FIG. 15, are heat lamps 96 positioned within reflectors 97. The heat lamps 96 are used to apply heat to the finish area of the workpiece 57 to cause crystallization thereof while the air knives 92 are intended to cool the workpiece 57 immediately below its finish area to prevent crystallization thereof. Finally, in the preheat section of the preheat pickup and drive module 10, as shown in FIGS. 4 and 14, the heat lamps 96 are used to preheat the plug member 52 and no air knives are in operation. Thus, in operation, the plug member 52 is preheated prior to insertion into the mouth of the workpiece. The workpiece then travels past the heat lamps 96 and air knives 92 such that the finish area of the workpiece receives heat from the preheated plug 52 and the heat lamps 96 to crystallize the finish area. The workpiece finally passes the cooling air nozzle as shown in FIG. 16 prior to exiting the machine.

Referring now to FIGS. 2 and 5, the right side elevation of the crystallizer machine of the present invention is shown. The processing modules 12 and 13, shown in FIG. 5, and the takeup module 11 include a plurality of the heat lamps 96, reflectors 97, and air knives 92, as shown in FIG. 15, which extend the full length on the right side of the processing modules 12 and 13 and up to a point proximate the takeup wheels 43, 44 of the takeup module 11. To ensure a full understanding of the Figs., the air knives, heat lamps and reflectors are only partially shown in number in the Figures. The plug 52 is preheated to a temperature of between 150° F. to 170° F. prior to insertion into the mouth of the workpiece 57. As the preheated plug 52 carries the workpiece past the heat lamps 96 and reflectors 97, the finish area of the PET workpiece is gradually heated to a crystallizing temperature of approximately 350° F. while the air knives 92 maintain the remainder of the body of the workpiece cool.

Appropriate sensors (not shown) are located throughout the crystallizing machine and are used to monitor the temperature of the preheated plug 52, monitor the proper seating of the mouth of the workpiece 57 with the plug 52, monitor the exhaust heat and monitor the cooling air temperatures. Other sensors may be used throughout the system as desired. All sensors provide signals to a central processing unit (not shown) which coordinates the operation of the crystallizing machine. Hot air is removed from the crystallizing machine through the hot air plenum 21 and exhausted to atmosphere.

To provide even preheating of the plug 52, the quill 51 has a gear 98 positioned immediately above the plug 52 which engages a stationary gear drive member 99, as shown in FIG. 14. Movement of the workpiece and engagement between the gear 98 and stationary gear drive 99 causes the plug 52 to continually rotate as it moves past the preheat sources, thereby providing even heat application to the surface of the plug 52. As shown in FIGS. 15 and 16, the engagement between the gear 98 and the stationary gear drive member 99 will impart continuous rotation to the workpiece engaged with the plug 52 as it travels past the various heat sources and cooling sources.

Referring now to FIGS. 4 and 6, the left side elevation of the takeup module 11 includes air knives 92 without heat lamps 96 as shown in FIG. 16. Cooling of the crystallized PET workpiece is effected by directing cool air from the air knives 92 over the entire workpiece 57. The workpiece continues to pass by cooling air knives 92 located on the back of the processing module 13 and part of the processing module 12 until the workpiece is removed and directed down the exit conveyor 103 located in processing module 12, as shown in FIGS. 3 and 6. After the workpieces have been removed from the plug 52, the plug 52 passes the preheating source consisting of heat lamps 96 and reflectors 97 without air knives, as shown in FIG. 14 to effect preheating of the plugs 52.

Figure 17:
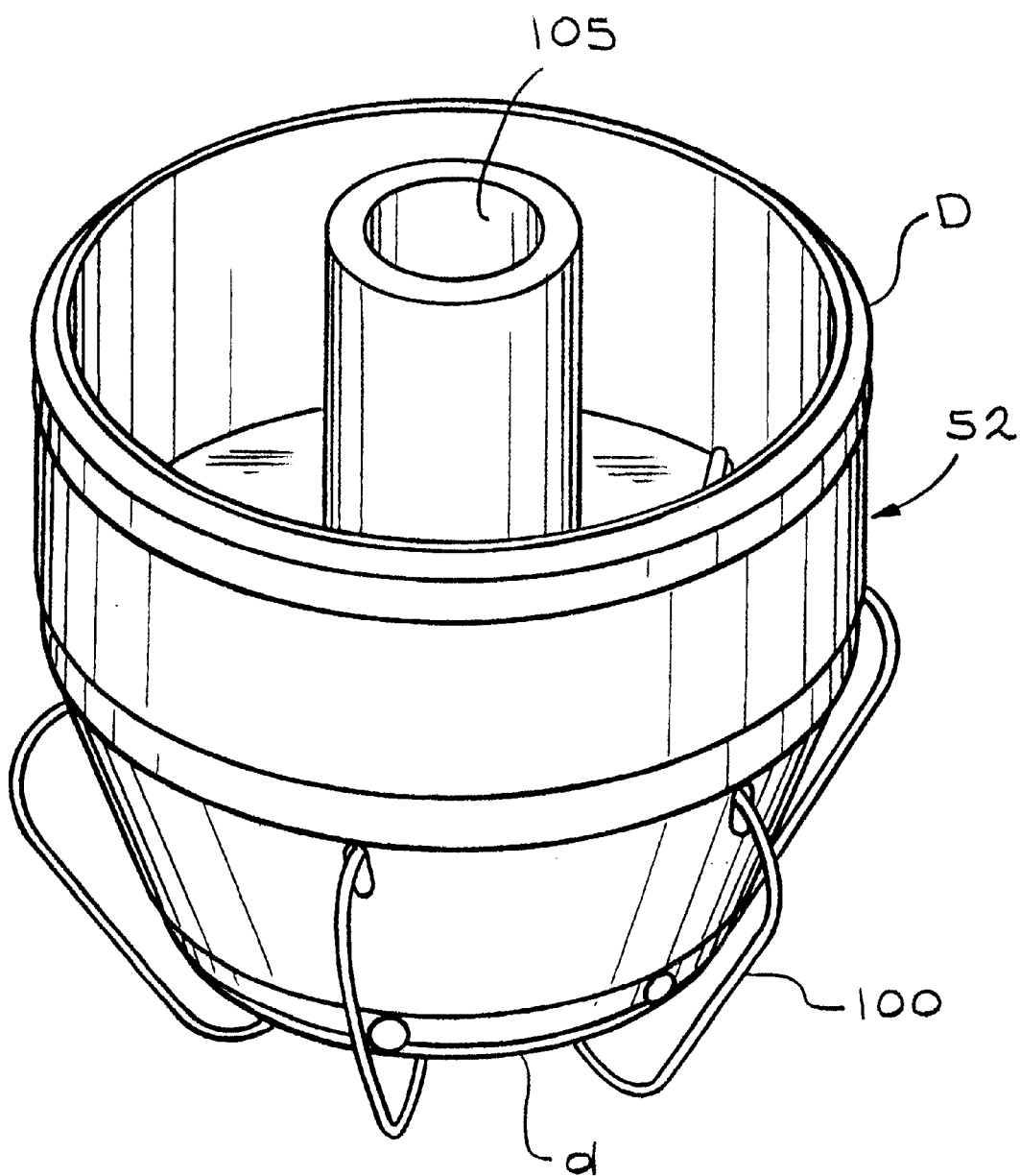
FIG. 17 is a perspective view of one embodiment of a workpiece pickup plug of the crystallizer machine of the present invention.

Referring now to FIG. 17, the preferred embodiment of the plug 52 is shown. The plug 52 is essentially a hollow shell constructed of hard coat anodized aluminum. The shell construction allows for rapid preheating of the plug 52. An engagement aperture 105 is positioned on the centerline of the plug 52 to receive the quill 51 and attach the plug 52 thereto by conventional means. The outside diameter D of the plug 52 closely approximates the inside diameter of the mouth of the workpiece to provide a snug secure fit when the plug 52 is inserted into the mouth of the workpiece. The plug 52 tapers inward and downward from the outside diameter D to a smaller diameter d which assists the plug 52 to be inserted into the mouth of the workpiece. Flexible wire springs 100 are positioned about the tapered portion of the plug 52, defining an outside diameter slightly larger than diameter D. The wire springs 100 flex when inserted into the mouth of the workpiece and expand to exert forces on the interior of the workpiece, thereby assisting in securing the workpiece on the plug 52.

The above description of the preferred embodiment of the crystallizer machine of this invention is intended to be illustrative in nature and is not intended to be necessarily limiting upon the potential equivalents when determining the scope and content of the following claim.

We claim:

1. A crystallizing machine for processing a thermoplastic workpiece having a mouth or opening at one end comprising in combination:

at least one plug for engagement with the mouth of the workpiece(s) and means for moving the at least one plug and its engaged workpiece(s) through the crystallizing process steps;

at least one heat source for applying heat to the workpiece(s) to heat the workpiece(s) to a temperature at which the thermoplastic crystallizes; and a disengagement member for removing the workpiece(s) from the at least one plug.

2. The crystallizing machine of claim 1 further including at least one cooling source for cooling the heated thermoplastic after crystallization.

3. The crystallizing machine of claim 1 wherein the at least one plug solely supports the workpiece(s) in an upright position.

4. The crystallizing machine of claim 1, wherein the at least one plug is heated prior to engagement with the workpiece(s).

5. The crystallizing machine of claim 4 wherein the thermoplastic is crystallized by the at least one heated plug and the at least one heat source.

* * * * *